United States Patent
Paul et al.

(10) Patent No.: US 7,512,075 B1
(45) Date of Patent: Mar. 31, 2009

(54) METHOD AND APPARATUS FOR COLLECTING STATISTICAL INFORMATION FROM A PLURALITY OF PACKET PROCESSING BLOCKS

(75) Inventors: Somnath Paul, Fremont, CA (US); Hamid Khodabandehlou, Milpitas, CA (US)

(73) Assignee: Cypress Semiconductor Corporation, San Jose, CA (US)

( * ) Notice: Subject to any disclaimer, the term of this patent is extended or adjusted under 35 U.S.C. 154(b) by 854 days.

(21) Appl. No.: 10/938,289

(22) Filed: Sep. 10, 2004

Related U.S. Application Data

(60) Provisional application No. 60/505,243, filed on Sep. 23, 2003.

(51) Int. Cl.
  *H04J 3/14* (2006.01)
(52) U.S. Cl. ........................... 370/250; 370/386
(58) Field of Classification Search ......... 370/229–235, 370/469, 503, 250–257, 386
  See application file for complete search history.

(56) References Cited

U.S. PATENT DOCUMENTS

| | | | |
|---|---|---|---|
| 5,542,047 A | 7/1996 | Armstrong et al. | |
| 5,805,596 A | 9/1998 | Kranzler et al. | |
| 5,809,026 A | 9/1998 | Wong et al. | |
| 5,872,787 A * | 2/1999 | Cooperman et al. | 370/412 |
| 6,108,782 A * | 8/2000 | Fletcher et al. | 713/153 |
| 6,785,272 B1 * | 8/2004 | Sugihara | 370/386 |
| 6,853,623 B2 * | 2/2005 | Nederveen et al. | 370/250 |

OTHER PUBLICATIONS

Waldbusser, *RFC 2819 Remote Network Monitoring MIB*, The Internet Society, May 2000.

* cited by examiner

*Primary Examiner*—Chi H. Pham
*Assistant Examiner*—Phuc Tran

(57) ABSTRACT

A system (100) can update a network performance counter and include link layer (MAC blocks) devices (102-0 to 102-N) coupled in a daisy chain manner. A single performance counter (104) can serve all of the link layer devices (102-0 to 102-N), receiving statistics vectors from all link layer devices (102-0 to 102-N) and a vector enable signal from a last link layer device 102-N in the chain. A method (1200) for updating a performance counter according to such a daisy chain configuration is also disclosed.

19 Claims, 10 Drawing Sheets

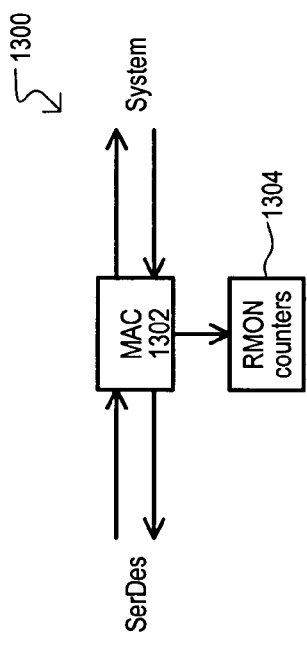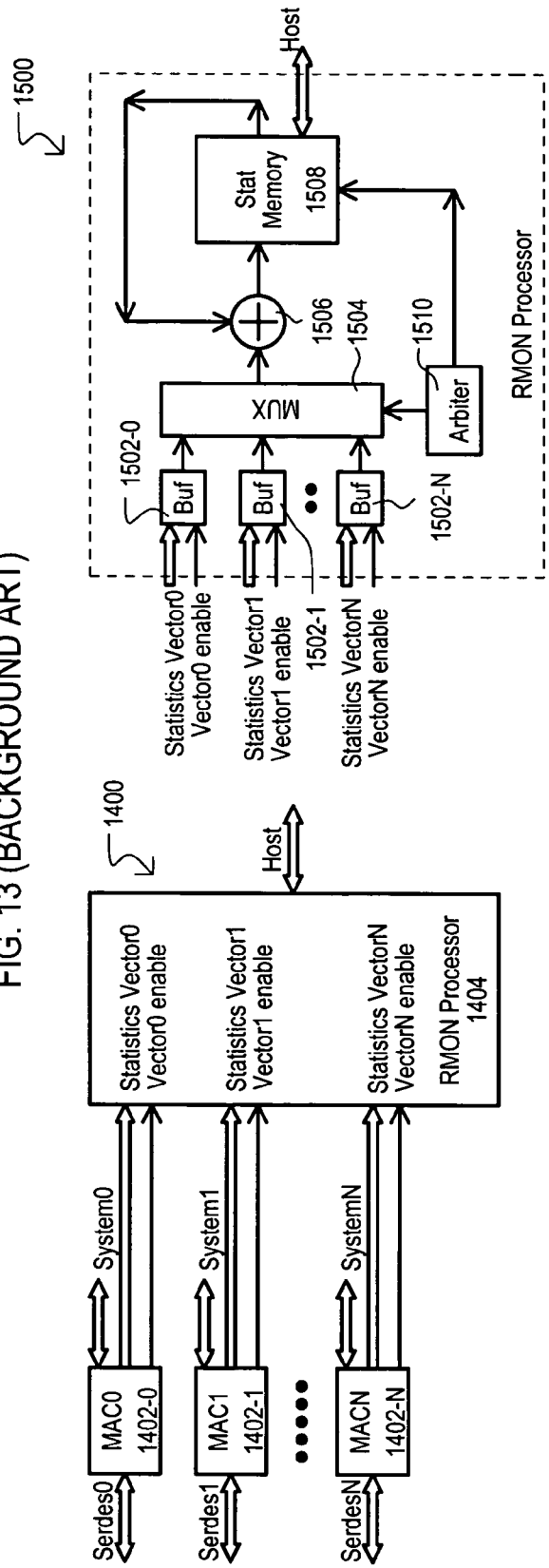
FIG. 13 (BACKGROUND ART)
FIG. 14 (BACKGROUND ART)
FIG. 15 (BACKGROUND ART)

US 7,512,075 B1

METHOD AND APPARATUS FOR COLLECTING STATISTICAL INFORMATION FROM A PLURALITY OF PACKET PROCESSING BLOCKS

This application claims the benefit of U.S. provisional patent application Ser. No. 60/505,243 filed on Sep. 23, 2003.

TECHNICAL FIELD

The present invention relates generally to electronic circuitry, and in particular to circuitry relating to network performance monitoring circuitry.

BACKGROUND OF THE INVENTION

Many networking technologies are in widespread use today, including Ethernet and related protocols (e.g., IEEE 802 standards), Fibre Channel, Enterprise-System Connection (ESCON), Infiniband®, Digital Video Broadcast—Asynchronous Serial Interface (DVB-ASI) and others. Such networking technologies can utilize performance counters. Performance counters provide data on various operating features of a network, and can thus enable remote monitoring and maintenance of the network.

To better understand various aspects of the embodiment described below, an exemplary conventional Ethernet type system will be described with reference to FIG. 13. A conventional system 1300 can include a media access controller (MAC) 1302, a remote monitoring (RMON) counter 1304, a serializer/deserializer (not shown) connected by a data path (SERDES), and a system bus (System 0 to System N).

In a conventional Ethernet type network, RMON counters are required for each media access controller (MAC). RMON counters are statistics counters for statistics provided by each MAC. Details regarding RMON counters are given in document RFC 2819 defined by the Internet Engineering Task Force (IETF) and the Internet Engineering Steering Group (IESG).

As is well understood, according to various data transmission protocols, including Ethernet type protocols, a link layer is a layer in any networking technology that sits approximately above the physical layer. In this document the term media access controller (MAC) and link layer can be considered essentially interchangeable. Also in this document, the term packet refers to a discrete unit of data and may be a packet, cell, frame or other unit of data carried in a network.

A typical transmit and receive Ethernet MAC device can use 32 counters. For a chip having several MACs, the operation of separately computing RMON counts for the statistics of each MAC can be expensive in terms of logic resources (gates) and hence result in undue increase in device size and/or introduce routing delays.

A first conventional approach to reducing the circuitry needed for computing RMON counts will now be described with reference to FIG. 14. A first conventional system 1400 can include a number of MACs 1402-0 to 1402-N, each of which can supply a statistic information vector (Statistics Vector0 to N) to an RMON processor block 1404. A statistics vector (Statistics Vector0 to N) can contain all the information required to update RMON counters for the MAC. Statistics information vectors (Statistics Vector0 to N) can be considered valid when a corresponding vector enable signal (Vector0 to N) is active.

For example, in an exemplary MAC (e.g., any of 1402-0 to 1402-N), there can be approximately 50 statistics related signals from a MAC transmit side to the RMON processor 1404. Further, there can be approximately 30 statistics related signals from MAC receive side to the RMON processor 1404.

Thus, it is understood that routing such numerous values for multiple MACs can introduce considerable wiring constraints and delays when implemented, as a large number of lines would have to be routed to a single RMON processor 1404.

FIG. 15 is a block schematic diagram of a conventional RMON processor such as that shown as 1404 in FIG. 14. An RMON processor 1500 can include an input buffer 1502-0 to 1502-N corresponding to each MAC, a multiplexer (MUX) 1504, an adder 1506, a statistics memory 1508, and an arbiter 1510.

Input buffers (1502-0 to 1502-N) can be relatively small sized buffers that can store statistics information coming from each MAC port. An arbiter 1510 can serve as an arbitration mechanism for reading data from input buffers (1502-0 to 1502-N) that helps ensure read data from one buffer does not overwrite read data from another.

In operation, a statistics memory 1508 can be read whenever statistics information is read from a corresponding input buffer (1502-0 to 1502-N). Memory read from a statistics memory 1508 can be added with data read from the corresponding input buffer (1502-0 to 1502-N) by operation of adder 1506. The resulting new value can then be written back into statistics memory 1508 to thereby store updated information.

In this way, a first conventional approach can multiplex statistics vectors to a single computing engine (i.e., adder and statistics memory) to thereby reduce a gate count needed to perform RMON count operations. However, a drawback to the conventional arrangement shown in FIGS. 14 and 15 can be the undesirably large amount of signal routing required to provide all statistics vectors and vector enable signals to a single RMON processor.

A second conventional approach to reducing the circuitry needed for computing RMON counts will now be described with reference to FIG. 16. A second conventional system 1600 can include MACs 1602-0 to 1602-N, a vector bus 1604, vector enable lines 1608, and an RMON processor 1610.

In the second conventional system 1600, a statistics vector from each MAC (1602-0 to 1602-N) can be WIRED-OR'd in order to deliver information to RMON processor 1610. In implementing such a WIRED-OR arrangement, outputs from each MAC (1602-0 to 1602-N) can be time-multiplexed through a shared vector bus 1604 instead of through separate buses for each MAC port. A shared vector bus 1604 can be a tri-statable bus where each MAC port can drives its output whenever enabled. This use of a shared vector bus can reduce the amount of routing going to a central location, but timing-wise, the arrangement can be less efficient if there is such a tristated bus going through all the MAC ports.

Disadvantages of the above-described conventional systems include the considerable routing needed to provide statistics information to a central location (e.g., RMON processor or simple network management protocol (SNMP) agent). This can lead to routing congestion and/or high power consumption. Further, because a significant number of statistics vector bits are required in a typical application, providing data paths for such a large number of bits can lead to high die area and increased routing and timing problems.

In light of the above, it would be desirable to have a mechanism of updating statistics counters for network devices that can have a single computing engine for multiple MACs, yet not suffer from the drawbacks of conventional arrangements, like those described above.

It would also be desirable to have a communication protocol between the MAC blocks and a statistics counter that could convey all the statistics counting related information with minimal routing overhead when compared with conventional approaches.

SUMMARY OF THE INVENTION

According to an embodiment, systems and methods for collecting statistics for updating remote monitoring (RMON) counters are described.

The present invention can include an architecture for updating a network performance counter. The architecture can include a plurality of link layer devices (e.g., MAC blocks), each providing performance statistics information based on processed data units (e.g., packets) at a data output. The link layer devices can be arranged in series from a first link layer device to a last link layer device, the data output of at least one link layer device being coupled to a data input of another link layer device. The architecture can further include a performance counter that receives the statistics information from all of the link layer devices from the data output of the last link layer device in the series.

In such an arrangement, statistics information (e.g., statistics vectors) for all link layer devices can be provided through one link layer device, allowing for considerable reduction in signal routing and/or power consumption.

According to one aspect of the embodiments, each link layer device can further provide a vector enable signal on an enable output that is active when the statistics information is output. The enable output of at least one link layer device can be coupled to an enable input of another link layer device. In addition, a performance counter can receive the vector enable signal of only the last link layer device in the series.

In such an arrangement, each vector enable signal can propagate from one link layer device to another, rather than to one centralized location. This can further reduce signal routing.

According to another aspect of the embodiments, an enable signal of each link layer device following the first link layer device can be enabled in response to the enabling signal of the previous link layer device in the series.

In this way, vector enable signals can propagate down the chain indicating the validity of statistics data for each link layer device.

According to another aspect of the embodiments, statistic information can include a statistics vector having a multi-bit length field corresponding to a length of a data unit, at least one error bit that indicates a data unit error event, at least one drop bit that indicates a dropped data unit, and a multi-bit runt field that indicates the size of an undersized data unit.

Such a statistics vector can provide a relatively compact data value for many common protocols.

According to another aspect of the embodiments, each statistics vector can further include at least one multicast bit that indicates a data unit directed to a multicast address, at least one broadcast bit that indicates a data unit directed to a broadcast address, and at least one vlan bit that indicates a data unit having a virtual local area network (VLAN) identifier.

Such a statistics vector values can provide widely utilized data values for many common protocols.

According to another aspect of the embodiments, a performance counter block can include a statistics memory for storing sum values of the statistics information, and an adder for adding received statistics information from the link layer devices with the corresponding sum value.

Such an arrangement can allow for rapid acquisition of network performance data at a single location without undue routing requirements.

According to another aspect of the embodiments, a performance counter can further include a control block that receives the vector enable signal from a last link layer device in the series.

Such an arrangement can enable storing of statistics information in response to one vector enable signal, instead of multiple vector enable signals.

According to another aspect of the embodiments, a control block can infer the timing of the statistics information for all previous link layer devices in the series from the vector enable signal of the last link layer device in the series, to thereby read the corresponding sum values from the statistics memory.

Such an arrangement can reduce or eliminate buffering of statistics information within a performance counter.

According to another aspect of the embodiments, the link layer devices can each output respective performance statistics information in synchronism with a system clock. In addition, a performance counter can latch the statistics information from all of the link layer devices in synchronism with the same system clock.

Such an arrangement can allow all statistics data acquisition operations to occur according to the timing of a single system clock. This can result in advantageously simple timing requirements for the various circuit blocks.

According to another aspect of the embodiments, the link layer devices can each process a minimum sized data unit in a time period tmin. In addition, a first link layer device in the series can generate a vector enable signals in a time period tservice, and tservice<tmin. Further, the vector enable signal of each link layer following the first link layer device can be generated in response to the vector enable signal of the previous link layer device in the series.

Such an arrangement can ensure that statistics information is gathered for each packet processed by a link layer device of the series.

According to another aspect of the embodiments, a number of link layer devices is N, where N>1, and a throughput time of a vector through each link layer device is t_proc, and tservice>N*(t_proc).

Such an arrangement can ensure that statistics information is accurately updated for each packet processed by a link layer device.

The present invention can also include a method of collecting statistics for updating performance counters of a plurality of link layer devices. The method can include arranging a plurality of link layer devices into at least one chain having a master link layer device at the start of the chain and a last link layer device at the end of the chain. The method can also include outputting a master statistics vector and master vector enable from the master link layer device at regular time intervals, and conditioning the output of a statistics vector and vector enable signals from the link layer devices following the master link layer device based on receipt of the vector enable signal from a previous link layer device in the chain.

According to another aspect of the embodiments, a vector enable signal of each link layer device can indicate that a statistics vector being output by the link layer device is currently valid.

According to another aspect of the embodiments, the method can further include, within each link layer device following the master link layer device in the chain, outputting a statistics vector of the current link layer device after passing the statistics vector of all previous link layer devices in the chain.

According to another aspect of the embodiments, the method can further include outputting a zero value as a statistics vector when not passing any previous statistics vectors or outputting the current statistics vector.

The present invention can also include a system for acquiring data network statistics. The system can include a plurality of blocks that each record network processing statistics. Such blocks can include at least one master block that outputs a multi-bit statistics vector and vector enable signal periodically, and at least one passing block that receives the statistics vector and vector enable signal from the master block, and passes the statistics vector of the master block and subsequently outputs its own statistics vector.

According to another aspect of the embodiments, the system can also include at least a first master block and a second master block that each output multi-bit statistics vectors and vector enable signals periodically, the statistics vector of the first master block propagating through at least one other passing block in a first chain of blocks, the statistics vector of the second master block propagating through at least another one passing block in a second chain of blocks. In addition, a processor block can receive statistics vectors from the first and second chains of blocks in parallel.

Such an arrangement can allow for rapid processing of large bit width statistics vectors while still retaining advantages of less routing congestion and/or power consumption.

According to another aspect of the embodiments, at least one passing block can include a multiplexer circuit that receives the statistics vector from the master block at one input and its own statistics vector at another input, and outputs statistics vectors from different blocks in a sequential manner.

Such an arrangement is in contrast to conventional network processing blocks which only output a statistics vector for the respective block.

According to another aspect of the embodiments, a master block and passing block can be formed in the same semiconductor substrate.

Such an arrangement can allow for an advantageously compact system.

According to another aspect of the embodiments, a master block and passing block can be formed in different semiconductor substrates.

Such an arrangement can allow for a system that accommodates a large numbers of blocks, as such a system can be expandable.

BRIEF DESCRIPTION OF THE DRAWINGS

FIG. 13 is a block schematic diagram of a conventional Ethernet type system.

FIG. 14 is a block schematic diagram showing a first conventional system for interfacing multiple media access controllers (MACs) with a single remote monitoring (RMON) processor.

FIG. 15 is a block schematic diagram of a conventional RMON processor that may be included in the system of FIG. 14.

DETAILED DESCRIPTION

Various embodiments of the present invention will now be described with reference to a number of diagrams. The embodiments show system and methods that may collect statistics information from various network devices, such as media access controllers (MACs). Unlike conventional arrangements, statistics information can pass through multiple MAC blocks in a "daisy chain" type fashion, thereby reducing the amount of signal wiring needed to convey such information to a single location (e.g., remote monitoring (RMON) processor).

Figure 1:
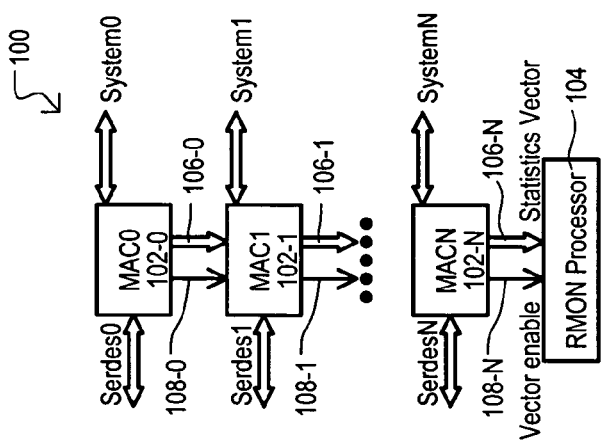
FIG. 1 is a block schematic diagram of a system according to one embodiment of the present invention.

A system according to a first embodiment is shown in FIG. 1 and designated by the general reference character 100. A system 100 can include a number of link layer devices, referred to herein as media access controller (MAC) blocks 102-0 to 102-N, and a statistics processor, referred to herein as a remote monitoring (RMON) processor 104. Of course, the term MAC and RMON should not be construed as limiting the invention to any particular data transmission protocol.

Each MAC block (102-0 to 102-N) can process data units (e.g., packets) and generate statistics data therefrom. In the very particular example of FIG. 1, each MAC block (102-0 to 102-N) can receive/transmit data from/to a network by way of a corresponding serial/deserializer data path (Serdes0 to N). Further, each MAC block (102-0 to 102-N) can output/input data to/from a system by way of a corresponding system bus (System 0 to N). Statistics data for each MAC block (102-0 to 102-N) can be provided on a corresponding data output (106-0 to 106-N) as a multi-bit value, or statistics vector. In addition, each MAC block (102-0 to 102-N) also includes a corresponding enable output (108-0 to 108-N) that provides a vector enable signal. A vector enable signal for a given MAC block (102-0 to 102-N) can be active when a valid statistics vector is being output from the MAC block.

In the improved arrangement shown in FIG. 1, each MAC block (102-0 to 102-N) can be connected in a daisy chain (open) fashion. That is, MAC blocks (102-0 to 102-N) can be arranged in a series with each MAC block (except the last MAC block 102-N) providing a statistics vector and vector enable signal to a next block in the chain. A last MAC block 102-N can have a data output 106-N and enable output 108-N connected to RMON processor 104. In such an arrangement, statistics vectors from all MAC blocks (102-0 to 102-N) can be provided to RMON processor by way of a single MAC block (last MAC block 102-N).

Figure 16:
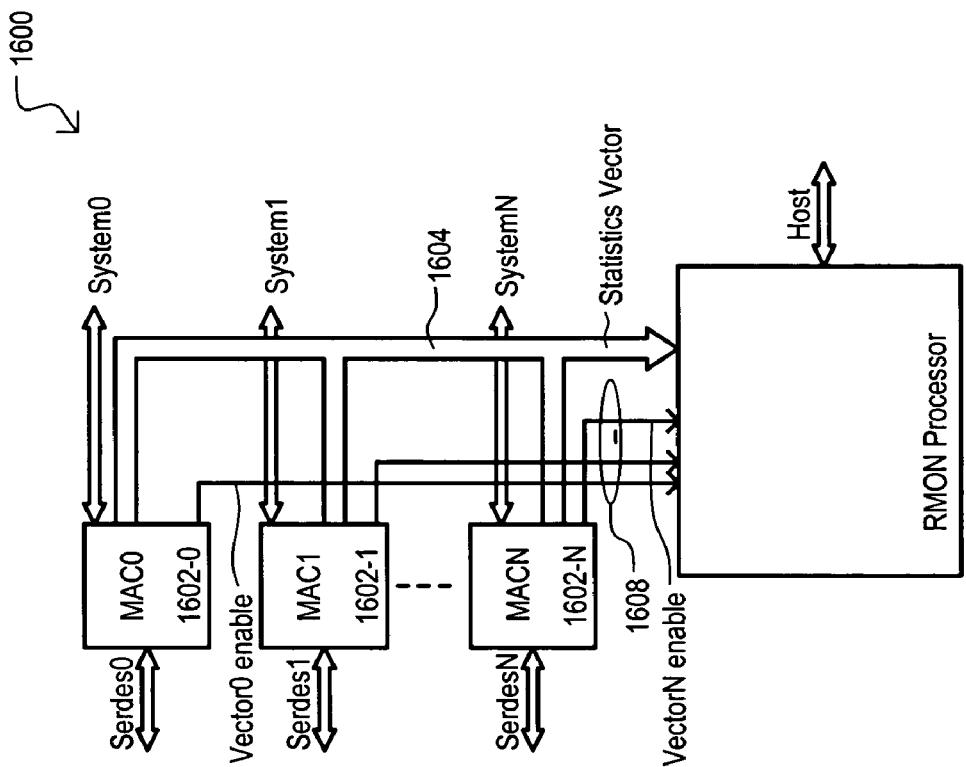
FIG. 16 is a block schematic diagram showing a second conventional system for interfacing multiple MACs with a single RMON processor.

This is in sharp contrast to the conventional arrangement of FIG. 14, in which statistics vectors and vector enables are provided to a common RMON processor, and the conventional arrangement of FIG. 16, in which statistics vectors are provided to a common bus.

A first MAC block 102-0 in the chain can be considered a "master" MAC block that initiates a protocol for collecting statistics information from all MAC blocks. Remaining MAC blocks (102-1 to 102-N) can be considered "passing" MAC blocks. As will be described in more detail below, a passing MAC block passes vector statistics from all previous MAC blocks in the chain followed by its own statistics vector and vector enable. In such an arrangement, a last MAC block 102-N in a chain can pass statistics vectors for all MAC blocks (102-0 to 102-N) by way of its data output 106-N to the RMON processor 104 followed by its own statistics vector and vector enable.

In addition, a MAC block (102-0 to 102-N) can preferably output a statistics vector value of "0" (e.g., all bits zero) when not outputting a valid statistics vector.

Figure 2:
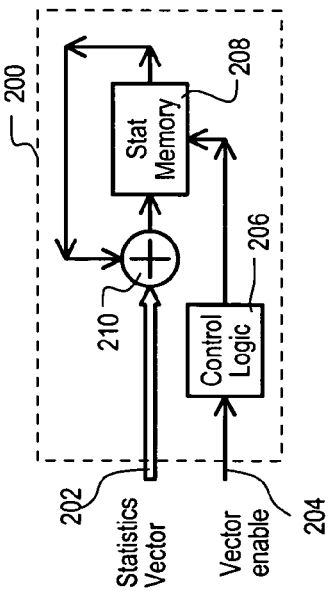
FIG. 2 is a block schematic diagram of a statistics processor according to one embodiment of the present invention.

Referring now to FIG. 2, one example of a statistics processor, such as that shown as 104 in FIG. 1 will now be described. A statistics processor 200 can include a data input 202, an enable input 204, control logic 206, a statistics memory 208, and an adder 210. A data input 202 can be connected to a data output of a last MAC block in a chain (e.g., 106-N) and thus receive statistics vectors for all MAC blocks of the chain. An enable input 204 can be connected to an enable output of a last MAC block in a chain (e.g., 108-N) and thus receive the vector enable signal of the last MAC block.

Statistics memory 208 can store statistics data derived from statistics vectors for all MAC blocks of a system. As but one particular example, a statistics memory 208 can include sum values for statistics data that represent accumulated values from multiple statistics vectors. Such sum values can be periodically read and/or reset to zero by a system, or the like.

Control logic 206 can control the operation of statistics memory 208 according to timing based on the vector enable signal received at enable input 204. For example, control logic 206 can generate commands for statistics memory 208 that read out a sum value to adder 210 as a corresponding statistics vector is being input on data input 202. The control logic 206 can then direct the writing of the resulting new sum back into the statistics memory 208. Even more particularly, control logic 206 can activate sequential read-modify-write operations as a corresponding sequence of statistics vectors is received at data input 202.

The operation of the system 100 shown in FIG. 1 will now be described with reference to a timing diagram shown in FIG. 3. The timing diagram of FIG. 3 includes waveforms that represent enable outputs and data outputs of each MAC block (102-1 to 102-N). Thus, waveforms "Vector enable 0" to "Vector enable N" correspond to enable outputs 108-0 to 108-N, respectively. Similarly, waveforms "Statistics Vector 0" to "Statistics Vector N" correspond to data outputs 106-0 to 106-N, respectively.

Figure 3:
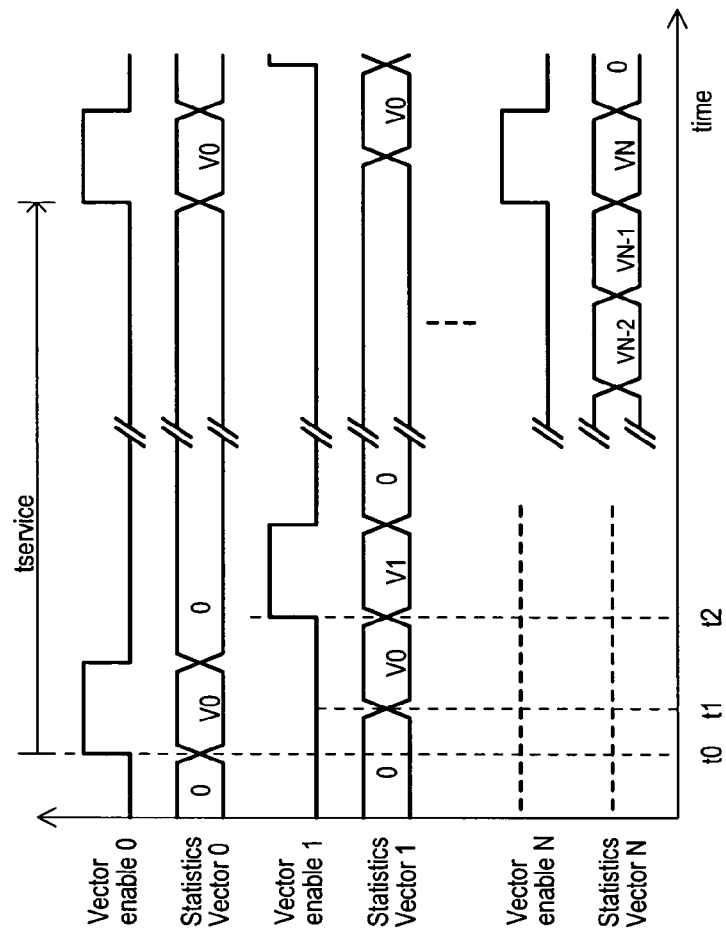
FIG. 3 is a timing diagram showing the operation of the system of FIG. 1 according to an embodiment.

Referring now to FIG. 1 in conjunction with FIG. 3, prior to time t0, MAC block 102-0 is not outputting a valid statistics vector, thus "Statistics Vector 0" can have some default idle value. In this case, the value is "0", thus all bits on data output 106-0 can be low.

At about time t0, master MAC block 102-0 can initiate the statistics gathering protocol by outputting its own vector statistic V0 while activating its own vector enable signal (in this example driving Vector enable 0 high). Such a statistics vector V0 can be received at a data input of a next MAC block 102-1 in the chain. Similarly, the active vector enables signal can be received at an enable input of MAC block 102-1.

As noted above, passing MAC blocks (102-1 to 102-N) can pass along any statistics vectors from previous MAC blocks in the chain. Thus, at about time t1, MAC block 102-1 can output statistics vector V0 received from master block 102-0. It is understood that such an operation can include internally latching (or otherwise registering) such a value, and then outputting the value.

In the embodiment shown, the timing for the vector enable of all passing MAC blocks (102-1 to 102-N) can be based on the vector enable of the preceding MAC block. Thus, at about time t2, Vector enable 1 is shown to be activated in response to Vector enable 0. At the same time its vector enable signal is active, MAC block 102-1 outputs its own vector statistic V1. In this way, a data output 108-1 of a passing MAC block provides a sequence of statistics vectors for all previous MAC blocks followed by its own statistics vector.

The above described operation can continue until a last MAC block 102-N has outputted statistics vectors for all MAC blocks in the chain, followed by its own statistics vector VN in conjunction with an active vector enable signal (Vector enable N).

From the above description it is understood that RMON processor 104 will receive a sequence of statistics vectors starting with a master value (V0) and ending with a last value (VN) at which time the vector enable signal (Vector Enable N) will be activated.

Referring back to FIG. 2, it is noted that unlike the conventional arrangement of FIG. 15, a statistics processor according to the embodiments does not necessarily have to include multiple input buffers. Instead, a statistics processor 200 can predict statistics vectors for each of MAC block on a same bus. A vector enable can be used to appropriately address the statistics memory. A statistic update operation (e.g., a read-modify-write) can then occur in a similar fashion as the conventional arrangement of FIG. 15.

As understood form the above, the embodiment of FIG. 1 can substantially reduce wiring congestion as compared to the conventional system of FIG. 14, as there is no need to provide routing to a central location, only to a next MAC block in the chain. Further, unlike the conventional arrangement of FIG. 16, no long bus lines or bus arbitration is needed. Further, the daisy chain connections between MAC blocks can be relatively short as compared to the connections of the conventional case, thus the charging/discharging of such lines may consume less power than the conventional cases.

While a MAC block according to the present invention may take a variety of forms, in terms of hardware implementation, each passing MAC block can include the equivalent of a multiplexer operation, where one input of the multiplexer is fed by a statistics vector of the respective MAC block while the other input of the multiplexer is fed with a statistics vector from a previous block. Further, a propagated vector may be registered to meet timing requirements of a particular implementation.

Figure 4:
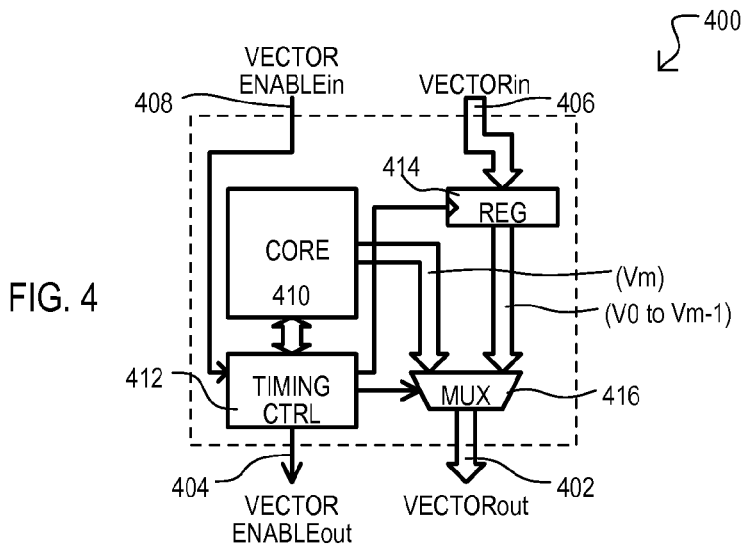
FIG. 4 is a block schematic diagram of a MAC block according to one embodiment.

One very particular example of a MAC block is shown in FIG. 4 and designated by the general reference character 400. The very particular MAC block 400 of FIG. 4 includes a data output 402, an enable output 404, a data input 406, and an enable input 408. In addition, the MAC block 400 has a core 410, a timing control section 412, a register 414, and a multiplexer (MUX) 416. A Serdes path and system bus are not shown in the figure to avoid cluttering the view.

A core 410 can generate statistics vector Vm based on processing of data packets, or the like. Such a statistics vector Vm can be provided a one input to MUX 416. A register 414 can receive and latch statistics vectors (V0 to Vm−1) from all previous MAC blocks in a chain.

A timing control section 412 can receive a vector enable signal from a previous MAC block in a chain (and may receive other timing signals, as will be described below). In response to such timing signals, a timing control section 412 can control the operation of register 414 and MUX 416. In a very particular arrangement, MAC block 400 can receive a clock signal and timing control section 412 can output the respective statistics vector Vm in synchronism with the clock after passing statistics vectors from previous MAC blocks.

Referring back to FIG. 1, while the respective timing between MAC blocks (102-0 to 102-N) and an RMON processor 104 could take a number of different forms, in one preferred embodiment both system sections can operate in synchronism with a single system clock. An example of one such arrangement is shown in a timing diagram in FIG. 5.

Figure 5:
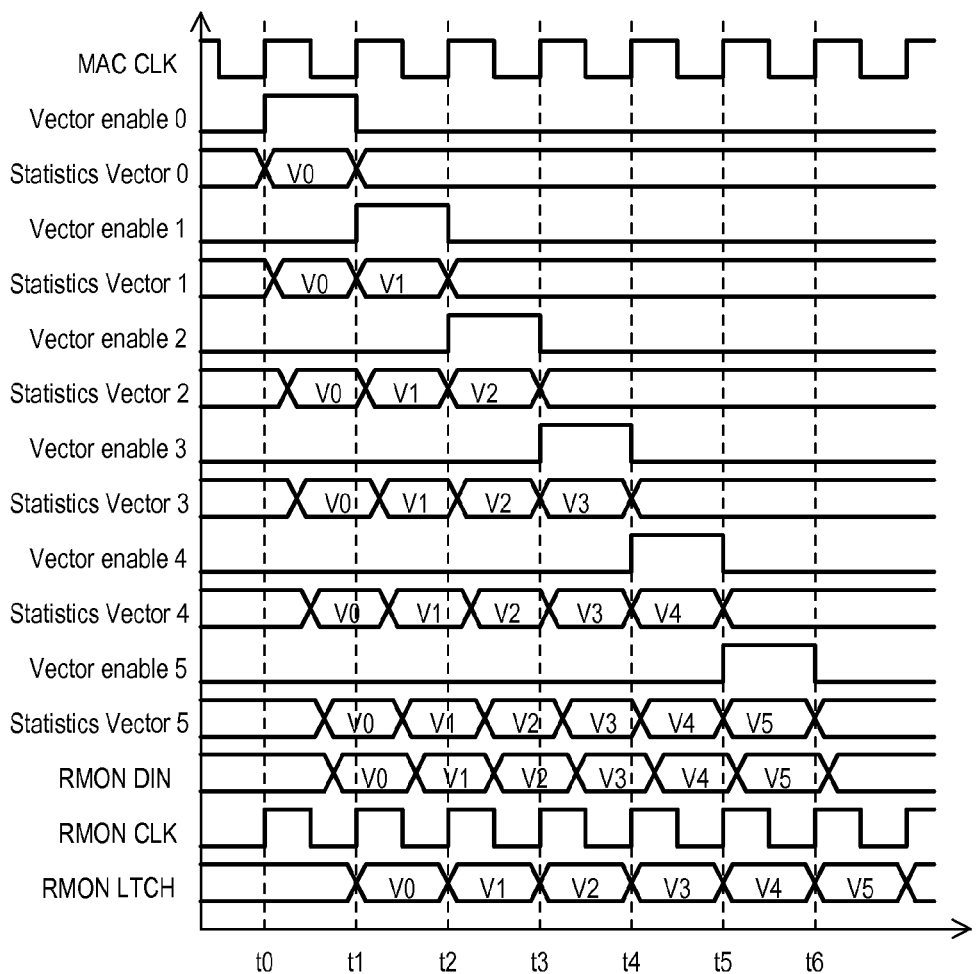
FIG. 5 is a timing diagram showing the operation of the system of FIG. 1 according to another embodiment.

FIG. 5 shows exemplary timing for a system 100 like that shown in FIG. 1, in which the number N is 5, thus the system includes six MAC blocks. MAC blocks (102-0 to 102-N) can output respective statistics vectors and activate respective vector enable signals in synchronism with respect to a clock MAC CLK.

As statistics vectors arrive at a data input of RMON processor 104 (RMON DIN) such data can be latched in response to a clock RMON CLK, which can be essentially the same clock as MAC CLK. In this way, an entire system can transfer/latch data according to single clock domain.

Of course, the above clocking arrangement should necessarily limit the invention thereto. As but a few examples, other embodiments could employ different timing arrangements. For example, an RMON processor can latch incoming vector statistics according to other edges of a global clock (e.g., falling edges). Similarly, an RMON could employ a delay locked loop (DLL) type circuit or phase locked loop (PLL) type circuit that can compensate for any propagation delay between MACs and the RMON processor.

Other arrangements could include clock multipliers, or the like, that can derive a clock from the periodic activation of the vector enable signal of the master MAC block. Alternatively, each vector statistics can include a unique set of bits to force a data transition to allow self-timed latching of incoming statistics vectors.

It is understood that a MAC block in the various embodiments can acquire statistics vectors for both received and transmitted packets. Thus, a vector enable signal can be active for transmit and receive operations, individually or combined.

In a combined case, a vector enable signal can be expected to remain active for at least 2 cycles, one for statistics vectors related to a packet transmit and the other for a packet receive. The duration of such a vector enable could vary based on the implementation.

Figure 6A:
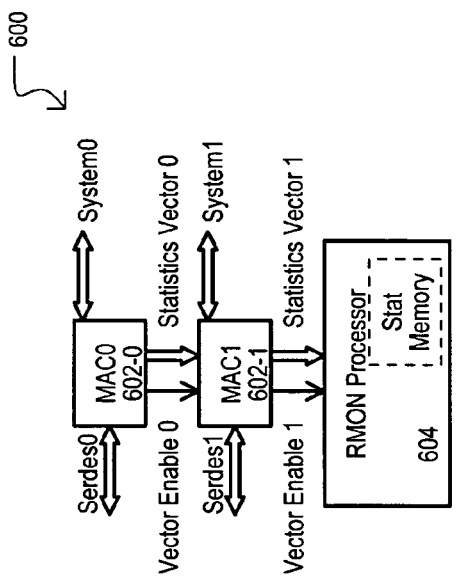
FIG. 6A is a block schematic diagram of a system according to another embodiment of the present invention.
Figure 6B:
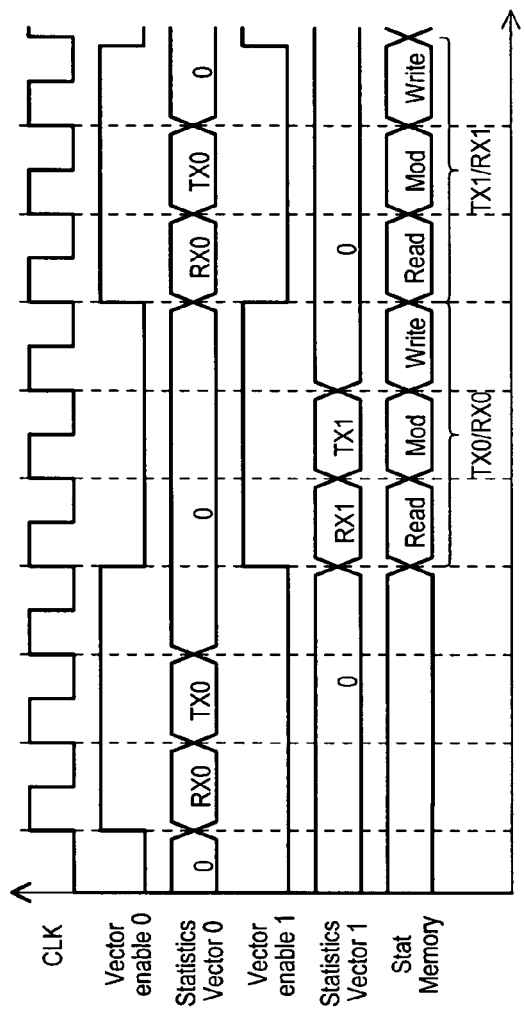
FIG. 6B is a timing diagram showing the operation of the system of FIG. 6A.

One very particular example of a combined case (i.e., vector enable active for both transmit and receive statistics) is shown in FIGS. 6A and 6B. FIG. 6A is a block schematic diagram of a system 600. FIG. 6B is a timing diagram showing the operation of the system of FIG. 6A.

The system of FIG. 6A comprises two MAC blocks (602-0 and 602-1) and an RMON processor 604. In such an arrangement, the time at which a master MAC block 602-0 initiates a vector enable to access statistics vectors can be every 6 cycles.

As shown by FIG. 6B, a first two cycles can be given to one MAC block 602-0 (a first cycle for receive info RX0 and a second cycle for the transmit info TX0), and the third cycle is kept idle to allow easy handling of data within a statistics memory 604.

In the arrangement shown, a memory update process for accumulating statistics data can involve a read-modify-write operation. Further, such an operation can require three cycles. Thus, the inclusion of a third idle cycle can help simplify timing in the illustrated implementation.

In this way, extra cycles can be included in vector enable durations to accommodate update times needed in a given statistics memory in an RMON processor 604.

Under the parameters of above illustrated embodiments, in order for accurate statistics data to be acquired, at most, information corresponding to one packet should exist in a given round of service. As a result, it is preferable that a second round of service start before a second packet has arrived, but also after all vector enables in a chain have been activated and all statistics vectors gathered (e.g., acquired by a RMON processor, or the like). It is understood that such timing is dependent upon the particular application in which an embodiment is employed (e.g., protocol involved, frequency of operation, minimum packet size, incoming/outgoing data rate). For example, an incoming data rate can vary considerably according to network type: in one embodiment 10 Mbps, 100 Mbps, or 1000 Mbps (Gigabit), or 10,000 Mbps (10 Gigabit).

Figure 7:
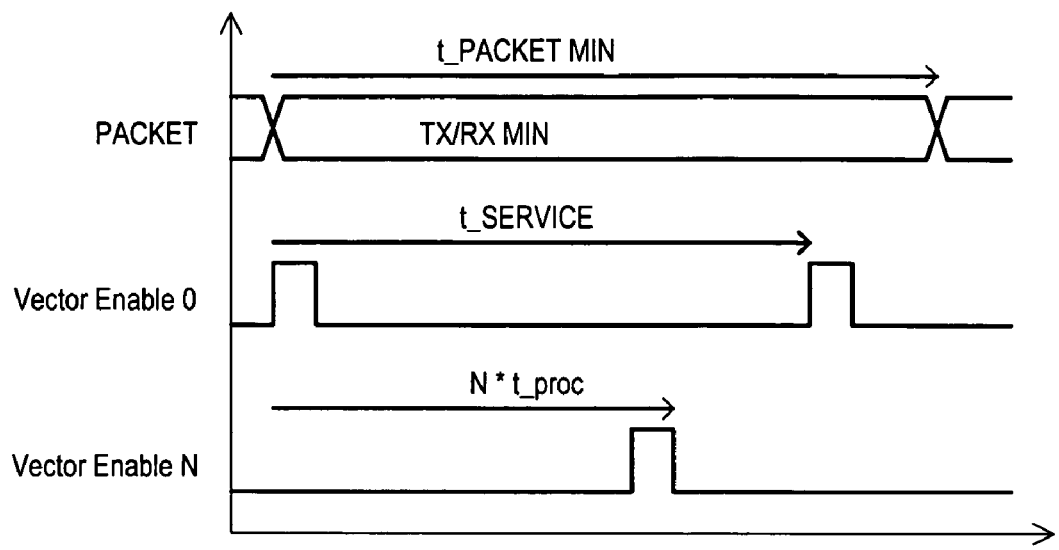
FIG. 7 is a timing diagram showing timing constraints for a master link layer device vector enable according to an embodiment.
Figure 8:
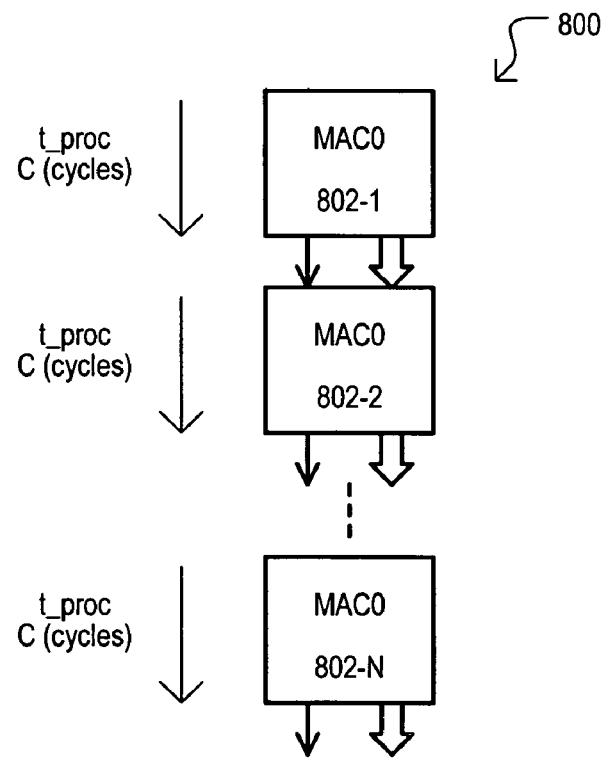
FIG. 8 is a block diagram showing additional timing constraints for a master link layer device according to an embodiment.

General desirable timing characteristics for systems according an embodiment are described with reference to FIGS. 7 and 8. FIG. 7 is a timing diagram showing the processing of a packet (reception or transmission) as well as vector enables for a master MAC block (Vector enable 0) and last MAC block (Vector Enable N). Also shown, is a PACKET waveform that represents the processing time for a minimum sized packet (i.e., data unit).

As shown by FIG. 7, a minimum sized packet can be processed in a time t_PACKET MIN. To ensure statistics are captured for all packets, a round of service (t_SERVICE) will have to be completed in a shorter time than t_PACKET MIN.

As noted above, a round of service must also be sufficient to capture all statistics data for a system. Referring now to FIG. 8, a block schematic diagram represents processing times for the various MAC blocks of a system 800. If it is assumed that the amount of time for each MAC block is "t_proc", the total time needed to process Statistics Vectors 1 to N is given by N*t_proc. Thus, a system may also meet the constraints of t_SERVICE>N*t_proc.

In one exemplary embodiment, using Gigabit Ethernet, a minimum sized 64 byte packet can be transmitted in 64*8 ns.=512 ns. With a 100 MHz system clock, such a minimum transmission time corresponds to 51.2 system clocks. As a result, round of service has to be less than 51 system clocks. As but one example, a value of 48 clocks can be chosen as the period of a vector enable generated by a master MAC block. That is, in such an example, a Vector enable 0 signal can be activated every 48 system clocks.

In the exemplary embodiment above, the following parameters are calculated. The service time (expressed in terms of clock cycles) at which the statistics information reads are repeated is shown as:

$$T\_SERVICE < MIN P*8000/(BW*TCLK).; \text{ and}$$
$$T\_SERVICE > N*C, \text{ where:}$$

N is the number of compute blocks and C is the number of cycles within each compute block; BW is a Data Bandwidth or the rate at which packets are transferred in Mbits per second, MINP is a Minimum packet size in bytes, TCLK is a Time period of system clock (clock at which RMON counters are processed and reads of vector happen), and T_SERVICE is the period at which at which the vector transfer is repeated.

In the above examples, a single vector width is assumed. In the case where a very large number of channels (or MAC blocks) need to be supported, a low value of t_SERVICE may not be feasible with a single chain of MAC blocks. Thus, alternate embodiments may include doubling (or more) the statistics vector width. This can be achieved by combining two MAC blocks into one compute block. In such a way, the number of blocks N can be virtually reduced, while C remains same. One example of such a combination block system is shown in FIGS. 9A and 9B.

Figures 9A, 9B:
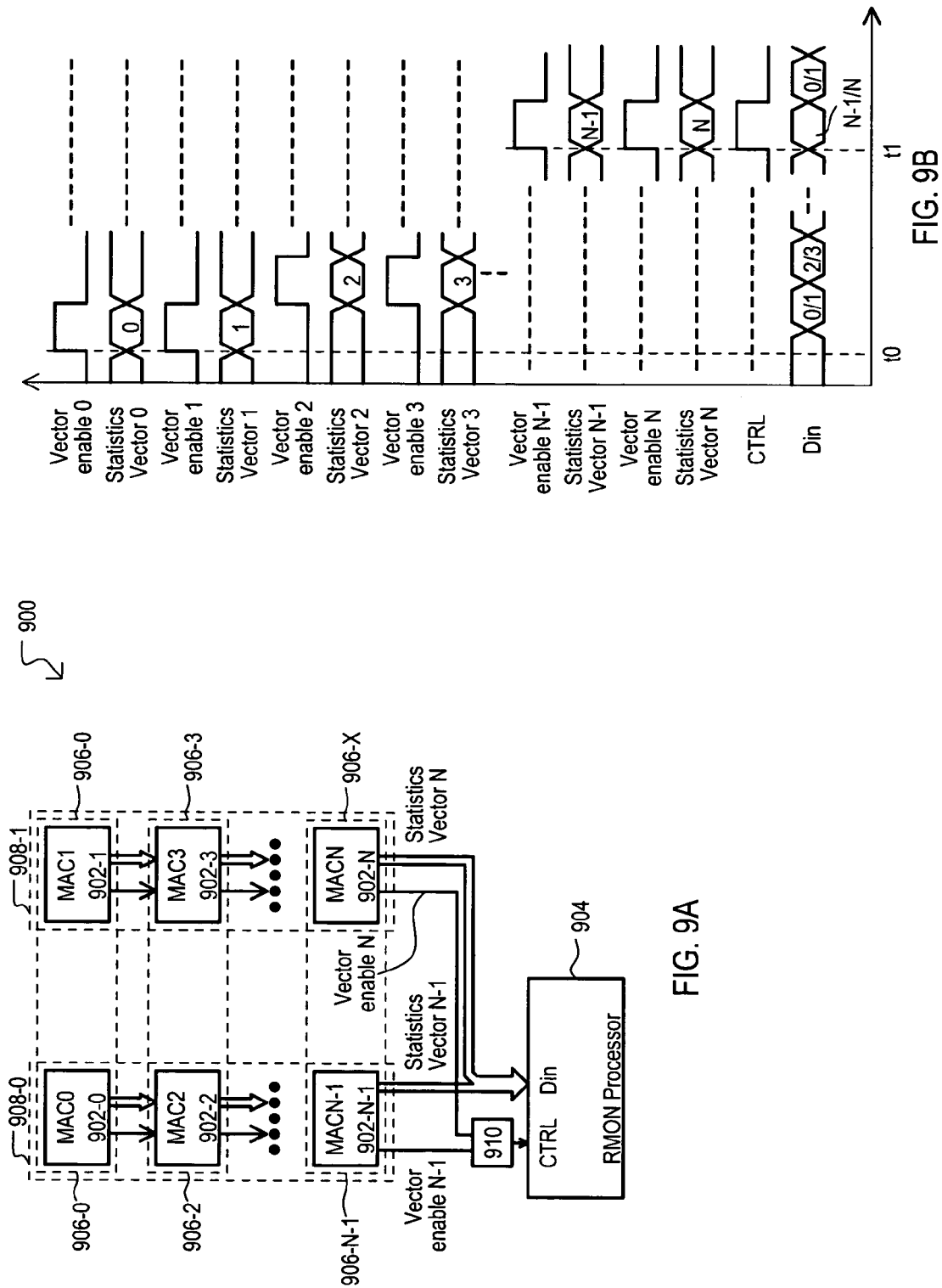
FIG. 9A is a block schematic diagram of a system according to another embodiment of the present invention.
FIG. 9B is a timing diagram showing the operation of the system of FIG. 9A.

FIG. 9A is a block schematic diagram of a system that includes multiple MAC blocks that are combined into a single compute block. In particular, FIG. 9A shows a system 900 that includes MAC devices 902-0 to 902-N and an RMON processor 904. Unlike the previous described embodiments, MAC blocks (902-0 to 902-N) can be arranged in into multiple compute blocks (906-0 to 906-X), in this particular example, two MAC blocks are included in each compute block. Looked at in another way, a system 900 can include essentially multiple chains 908-0 to 908-1, each of which can generate a sequence of statistics vectors and vector enable signals.

A system 900 may also include a logic circuit 910 that can interlock multiple vector enable signals to generate a single enable signal for RMON processor 904. Of course, such logic circuits could also be employed between compute blocks (906-0 to 906-X) to interlock timing between MAC blocks within.

As would be understood from the above, a data input Din of RMON processor 904 may have a larger bit width to accommodate multiple statistics vectors in parallel (in this example, two statistics vectors in parallel).

The operation of the system 900 will now be described with reference to FIG. 9B. At about time t0, MAC blocks 902-0 and 902-1 of compute block 906-0 can issue vector enable signals Vector enable 0 and Vector enable 1 with corresponding Statistics Vector 0 and Statistics Vector 1, respectively. Thus, MAC blocks 902-0 and 902-1 can be considered master MAC blocks.

Operation along chains 908-0 and 908-1 can occur as described above. Thus, at about time t1, last vector enable signals (Vector enable N−1 and Vector enable N) can be output with corresponding vectors (Statistics Vector N and Statistics Vector N−1), respectively. A logic circuit 910 can generate a common enable signal CTRL from Vector enable N−1 and Vector enable N. An RMON processor 904 can input pairs of statistics vectors in parallel, as shown by the Din waveform.

While the previous embodiment has illustrated essentially parallel acquisition of statistics data along multiple chains, the present invention should not necessarily be limited to such an arrangement. Provided an RMON processor can read and update data at a sufficient rate, output statistics vectors from different chain could be input one after the other (phase delayed from one another).

It is understood that a physical implementation of any of the above embodiments may encompass one or multiple integrated circuit devices. That is, while it may be preferable to include one or more MAC block chains and an RMON processor on a single integrated substrate, alternate embodiments could be implemented as a series of blocks distributed across a plurality of devices (or "chips"). Such variations are illustrated by FIGS. 10A and 10B.

Figure 10B:
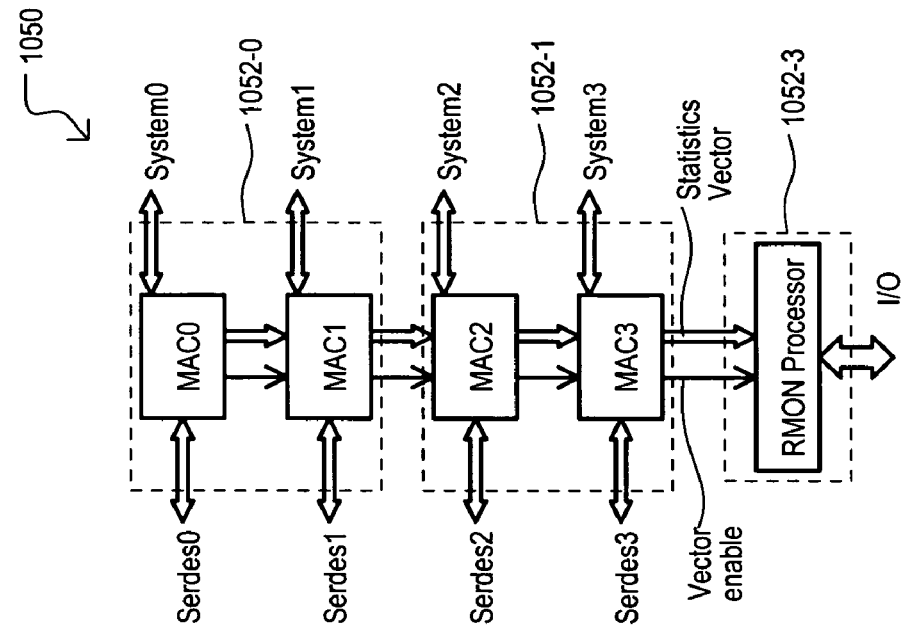
FIGS. 10A and 10B are top plan views showing single and multiple device embodiments.
Figure 10A:
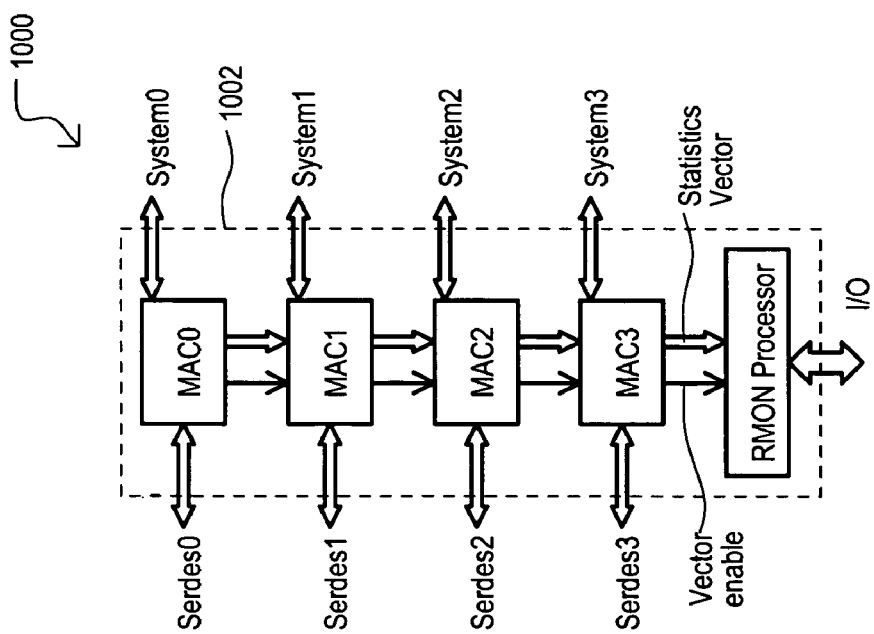

FIG. 10A shows a single device solution. The system 1000 includes multiple MAC blocks all formed on the same integrated circuit substrate 1002 as a corresponding RMON processor.

FIG. 10B shows but one very particular example of a multiple device solution. The system 1050 includes some MAC blocks formed in one integrated circuit substrate 1052-0, other MAC blocks formed on another integrated circuit substrate 1052-1, and an RMON processor formed on its own integrated circuit substrate 1052-3. Of course, a multiple device solution could numerous other variations, with different combinations of components distributed over multiple substrates. In such alternative embodiments, all devices in a chain would have to be active for the chain to operate. Further, the number of MAC blocks that would be included in a system could be limited only by the timing requirements noted by the various equations shown above. Thus, a multiple device case may be advantageously expandable.

Figure 11A:
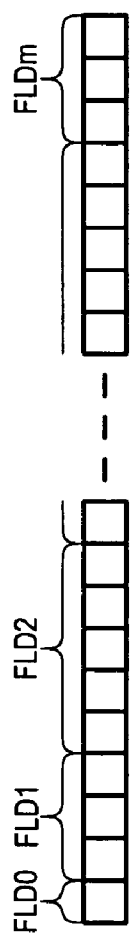
FIGS. 11A to 11C are diagrams showing examples of statistics vectors according to various embodiments.

A statistics vector according the various embodiments may take a variety of forms, typically dictated by a network information gathering protocol. In general, a statistics vector may take the general form shown in FIG. 11A. That is, a statistics vector may be a multi-bit value, preferably output in parallel, which is divided into a number of fields (shown as FLD0 to FLDm). Each such field can include a particular data values related to a transmitted/received data unit (e.g., packet).

Figure 11B:
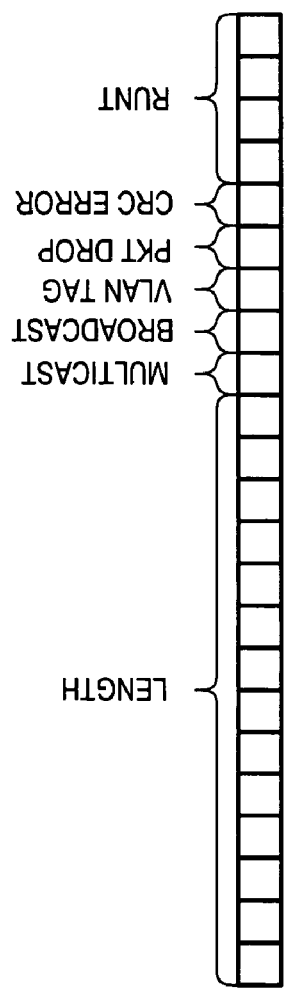
Figure 11C:
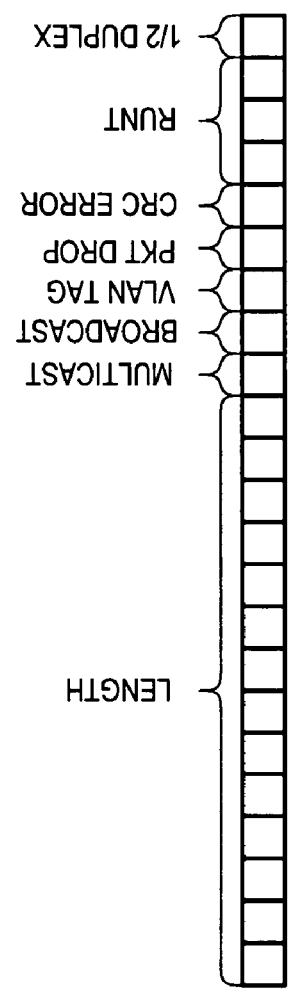

FIGS. 11B and 11C show two very particular examples of statistics vectors according to embodiments. In the exemplary embodiments, a statistics vector for each MAC block can be implemented as a 23-bit vector corresponding to each receive and transmit line of the respective MAC block.

In the example of FIG. 11B, a statistics vector can comprise 14 bits of length (to cover "jumbo" sized frames) (LENGTH), 1 bit each to indicate a packet (i.e., data unit) directed to a multicast address (MULTICAST), a packet directed to a broadcast address (BROADCAST), a packet having a virtual local area network (VLAN) identifier (VLAN TAG), the dropping of a packet (PKT DROP), and a cyclic redundancy check (CRC ERROR), and 4 bits of runt packet count (RUNT). A runt packet is one with proper framing but having less than a minimum packet size (e.g., 64 bytes).

It is noted that the example of FIG. 11B does not include information relating to half-duplex operation. One very particular example of a statistics vector that can include such information is shown in FIG. 11C. FIG. 11C is similar to FIG. 11B, but a runt packet count size has been reduced by 1 bit. Such an arrangement may be particularly suitable for a protocol that includes a standard 7 bytes of preamble and one byte of start-of-frame delimiter (SFD). Further, in one exemplary embodiment, the number of preamble bytes could even be 1 byte.

Having described various systems according to embodiments, a method according to an embodiment will now be described with reference to a flow diagram in FIG. 12.

A method 1200 can include arranging MAC blocks (i.e., link layer devices) into a chain (step 1202). Such a step can include designing a single integrated circuit and/or multiple MAC blocks having input-output connections as described in any of the various embodiments above. A first MAC block of the chain can be designated as a master MAC block (step 1204).

A method 1200 can then proceed to acquire statistics vectors (i.e., performance statistics data). Such an action includes, in the particular example of FIG. 12, issuing a vector enable and statistics vector from a master MAC block (step 1206). Actions may then proceed with each MAC block that follows in the chain (step 1208).

Thus, each MAC block following a master MAC block can output a statistics vector from a previous MAC block in the chain (step 1210). Such previous statistics vectors can be output until a vector enable signal is received (step 1212). Once a vector enable is received, the current MAC block can output its own statistics vector and vector enable (step 1214). Such actions can continue for each MAC block until the last MAC block issues its statistics vector and vector enable (step 1216).

Once a service time t_SERVICE has been reached, the method may return to step 1206 to begin a new round of service (step 1218).

Figure 12:
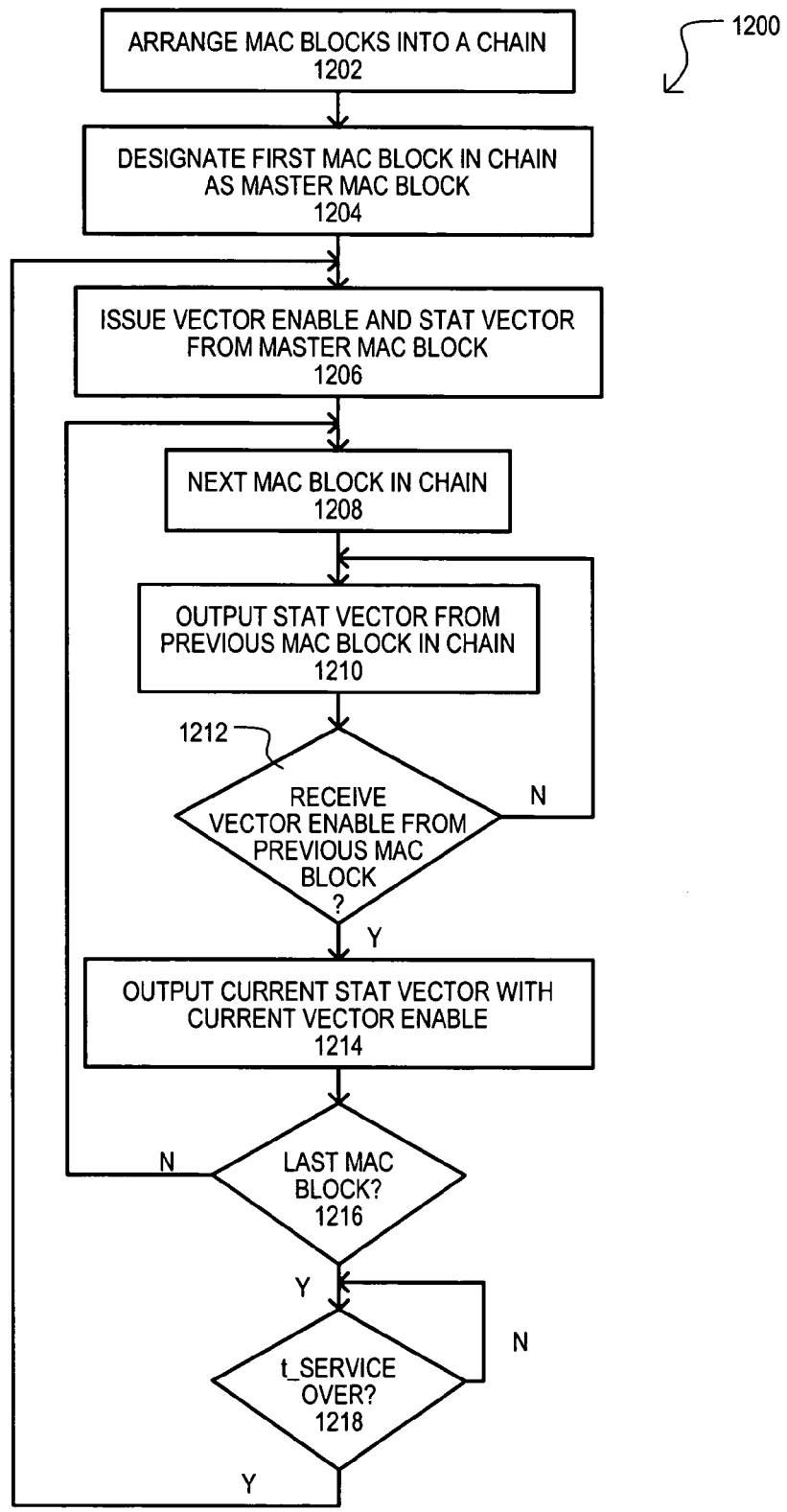
FIG. 12 is a flow diagram showing a method according to one embodiment of the present invention.

Of course, one skilled in the art would understand that FIG. 12 represents an operational view of an embodiment and not a temporal flow. As understood with reference to the various systems described above, as statistics vectors can be output (e.g., are passed) sequentially by multiple MAC blocks.

Advantages of the improved solution over the conventional solution include greatly reduced routing and congestion and/or lower overall gate count.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Accordingly, it is understood that while the various aspects of the particular embodiment set forth herein has been described in detail, the present invention could be subject to various changes, substitutions, and alterations without departing from the spirit and scope of the invention.

What is claimed is:

1. An architecture for updating a network performance counter, comprising:
  a plurality of link layer devices, each providing performance statistics information based on processed data units at a data output and a corresponding vector enable signal, the link layer devices being arranged in series from a first link layer device to a last link layer device, data output of at least one link layer device coupled to a data input of another link layer device; and
  a performance counter that receives the statistics information from all of the link layer devices from the data output of the last link layer device in the series and that receives the vector enable signal of only the last link layer device.

2. The architecture of claim 1, wherein:
  each link layer device further providing its vector enable signal on an enable output that is active when the statistics information for the link layer device is output at the data output, the enable output of at least one link layer device coupled to an enable input of another link layer device.

3. The architecture of claim 2, wherein:
  the enable signal of each link layer device following the first link layer device is enabled in response to the enabling signal of the previous link layer device in the series.

4. The architecture of claim 2, wherein:
  each link layer device processes a minimum sized data unit in a time period tmin;
  the first link layer device in the series generates its vector enable signal in a time period tservice, and tservice<tmin; and
  the vector enable signal of each link layer following the first link layer device is generated in response to the vector enable signal of the previous link layer device in the series.

5. The architecture of claim 4, wherein:
  the number of link layer devices is N, where N>1, and a throughput time of a vector through each link layer device is no less than a processing time period t_proc, and tservice>N*(t_proc).

6. The architecture of claim 1, wherein:
  each statistic information includes a statistics vector comprising a multi-bit length field corresponding to a length of a data unit, at least one error bit that indicates a data unit error event, at least one drop bit that indicates a dropped data unit event, and a multi-bit runt field that indicates a data unit having a length less than a predetermined minimum length.

7. The memory device of claim 6, wherein:
  each statistics vector further comprises at least one multicast bit that indicates a data unit directed to a multicast address, at least one broadcast bit that indicates a data unit directed to a broadcast address, and at least one vlan bit that indicates a data unit having a virtual local area network (VLAN) identifier.

8. The architecture of claim 1, wherein:
  the performance counter comprises a statistics memory for storing sum values of the statistics information, and an adder for adding received statistics information from the link layer devices with a corresponding sum value.

9. The architecture of claim 8, wherein:
  each link layer device further providing a vector enable signal on an enable output that is active when the statistics information of the link layer device is output at the data output, and the enable output of at least one link layer device coupled to an enable input of another link layer device; and
  the performance counter further comprises a control block that receives the vector enable signal from the last link layer device in the series.

10. The architecture of claim 9, wherein:
  the control block determines the timing of the statistics information for all previous link layer devices in the series from the data enable signal from the last link layer device in the series to read the corresponding sum values from the statistics memory.

11. The architecture of claim 1, wherein:
  the plurality of link layer devices each provide respective performance statistics information in synchronism with a system clock; and
  the performance counter latches the statistics information from all of the link layer devices in synchronism with the system clock.

12. A method of collecting statistics for updating performance counters of a plurality of link layer devices, comprising the steps of:
- arranging a plurality of link layer devices into at least one chain having a master link layer device at the start of the chain and a last link layer device at the end of the chain;
- outputting a master statistics vector and master vector enable from the master link layer device at regular time intervals; and
- conditioning the output of a statistics vector and vector enable signals of link layer devices following the master link layer device based on receipt of the vector enable signal from a previous link layer device in the chain.

13. The method of claim 12, wherein:
the vector enable signal of each link layer device indicates that a statistics vector being output by the link layer device is currently valid.

14. The method of claim 12, further including:
within each link layer device following the master link layer device in the chain, outputting a statistics vector of the current link layer device after passing the statistics vector of all previous link layer devices in the chain.

15. The method of claim 12, further including:
within each link layer device, outputting a zero value as a statistics vector when not passing any previous statistics vectors or outputting the current statistics vector.

16. A system for acquiring data network statistics, comprising:
- a plurality of blocks that each record network processing statistics including
- at least one master block that outputs a multi-bit statistics vector and vector enable signal periodically, and
- at least one passing block that receives the statistics vector and vector enable signal from the master block, passes the statistics vector of the master block and subsequently outputs its own statistics vector, the at least one passing block including a multiplexer circuit that receives the statistics vector from the master block at one input and its own statistics vector at another input, and outputs statistics vectors from different blocks in a sequential manner.

17. The system of claim 16, further including:
at least a first master block and a second master block that each output multi-bit statistics vectors and vector enable signals periodically, the statistics vector of the first master block propagating through at least one other passing block in a first chain of blocks, the statistics vector of the second master block propagating through at least another one passing block in a second chain of blocks; and
a processor block that receives statistics vectors of the first and second chains of blocks in parallel.

18. The system of claim 16, wherein:
the master block and passing block are formed in the same semiconductor substrate.

19. The system of claim 16, wherein:
the master block and passing block are formed in different semiconductor substrates.

* * * * *